(12) United States Patent
Malyarov

(10) Patent No.: US 10,829,316 B2
(45) Date of Patent: Nov. 10, 2020

(54) LINEAR MOTOR HOUSING CONSTRUCTION

(71) Applicant: Siemens Healthcare Diagnostics Inc., Tarrytown, NY (US)

(72) Inventor: Ilya Malyarov, Livingston, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 0 days.

(21) Appl. No.: 16/319,237

(22) PCT Filed: Jul. 19, 2017

(86) PCT No.: PCT/US2017/042911
§ 371 (c)(1),
(2) Date: Jan. 18, 2019

(87) PCT Pub. No.: WO2018/017748
PCT Pub. Date: Jan. 25, 2018

(65) Prior Publication Data
US 2019/0276249 A1    Sep. 12, 2019

Related U.S. Application Data

(60) Provisional application No. 62/365,216, filed on Jul. 21, 2016.

(51) Int. Cl.
*B65G 54/02* (2006.01)
*B65G 37/02* (2006.01)
(Continued)

(52) U.S. Cl.
CPC ............ *B65G 54/02* (2013.01); *B65G 37/02* (2013.01); *G01N 35/02* (2013.01); *G01N 35/04* (2013.01);
(Continued)

(58) Field of Classification Search
CPC ........ B65G 54/02; B65G 37/02; G01N 35/02; G01N 35/04
(Continued)

(56) References Cited

U.S. PATENT DOCUMENTS 5,395,586 A    3/1995   Hemzy et al.
5,749,131 A *   5/1998   Breil ..................... B29C 55/165
                                                       26/89
(Continued)

FOREIGN PATENT DOCUMENTS

CH         558 271 A     1/1975
JP      H05-236731 A     9/1993
(Continued)

OTHER PUBLICATIONS

PCT International Search Report and Written Opinion dated Nov. 9, 2017 (11 Pages).
(Continued)

*Primary Examiner* — Douglas A Hess

(57) ABSTRACT

A system for transporting a carrier vehicle using linear motors comprising a linear motor housing shaped to hold one or more linear motors includes a rectangular top plate. A left side plate is connected adjacent to a first longitudinal edge of the rectangular top plate and a right side plate is connected adjacent to a second longitudinal edge of the rectangular top plate. The linear motor housing further includes a plurality of coupling components operable to couple the linear motor housing to one or more adjacent linear motor housings in a manner that facilitates continuous propulsion of the carrier vehicle across the rectangular top plate of the linear motor housing and rectangular top plates corresponding to the one or more adjacent linear motor housings.

17 Claims, 5 Drawing Sheets

(51) Int. Cl.
  *G01N 35/02* (2006.01)
  *G01N 35/04* (2006.01)
(52) U.S. Cl.
  CPC .............. *B65G 2201/0294* (2013.01); *G01N 2035/0406* (2013.01); *G01N 2035/0475* (2013.01)
(58) Field of Classification Search
  USPC ........................................................ 198/619
  See application file for complete search history.

(56) References Cited

U.S. PATENT DOCUMENTS

| | | | | |
|---|---|---|---|---|
| 8,616,134 | B2* | 12/2013 | King | B60L 13/003 |
| | | | | 104/284 |
| 8,833,544 | B2* | 9/2014 | Stoeckle | B65G 19/24 |
| | | | | 198/619 |
| 8,967,051 | B2* | 3/2015 | King | B60L 13/003 |
| | | | | 104/284 |
| 9,032,880 | B2* | 5/2015 | King | E01B 25/34 |
| | | | | 104/281 |
| 9,292,018 | B2* | 3/2016 | Hanaka | B61L 25/026 |
| 9,802,507 | B2* | 10/2017 | Clark | B60L 15/005 |
| 10,118,775 | B2* | 11/2018 | Walter | H02K 41/02 |
| 10,280,016 | B2* | 5/2019 | Wernersbach | B65G 47/642 |
| 10,351,350 | B2* | 7/2019 | Nara | B65G 35/06 |
| 10,407,246 | B2* | 9/2019 | Reinthaler | B65G 23/23 |
| 10,518,979 | B2* | 12/2019 | Takeuchi | B65G 17/14 |
| 2003/0230941 | A1 | 12/2003 | Jacobs | |
| 2009/0026712 | A1 | 1/2009 | Kawanishi et al. | |
| 2010/0236445 | A1 | 9/2010 | King et al. | |
| 2013/0002011 | A1 | 1/2013 | Meyer et al. | |
| 2015/0355211 | A1 | 12/2015 | Mellars et al. | |
| 2019/0389019 | A1* | 12/2019 | Sticht | |

FOREIGN PATENT DOCUMENTS

| | | |
|---|---|---|
| JP | 2004-055767 A | 2/2004 |
| JP | 2004-095862 A | 3/2004 |
| JP | 2015-049109 A | 3/2015 |
| JP | 2015-534436 A | 11/2015 |

OTHER PUBLICATIONS

Supplementary EP Search Report dated Jul. 25, 2019 of the corresponding European Application No. 17831814.3, 5 Pages.

* cited by examiner

LINEAR MOTOR HOUSING CONSTRUCTION

CROSS-REFERENCE TO RELATED APPLICATIONS

This application claims the benefit of U.S. Provisional Application Ser. No. 62/365,216 filed Jul. 21, 2016, which is incorporated herein by reference in its entirety.

TECHNICAL FIELD

The present invention relates in general to a linear motor housing for use in a laboratory testing environment, for example, to facilitate transportation of patient samples for in vitro diagnostics in a clinical analyzer.

BACKGROUND

Intelligent conveyor systems are used in assembly automation, material handling, and other industries to provide for efficient transport of goods across various environments. For example, in the context of in vitro diagnostic laboratory testing environments, intelligent conveyor systems transport individual carrier vehicle, sometimes called pucks, or racks of containers between different testing modules placed along a track. Samples may be stored in test tubes and placed into a puck by an operator or robot arm for transport between each testing module.

Motive force can be provided to the carriers in a variety of ways. Traditionally, a roller system has been employed wherein rollers around the carrier vehicle along a track provide individualized velocity, acceleration, and jerk. A newer technology for providing motive force is linear synchronous motors (LSMs). In LSM-based systems, motive force is provided by selectively active electromagnetic coils in the track that propel one or more magnets in the carrier. The coils are contained in a housing that includes a stainless track surface over which the carriers move. The housing also includes side skirts (hanging down from the stainless track surface) and side rails which guide the carrier as it moves along the track surface.

Linear motor assemblies for intelligent conveyor systems are often entirely constructed of rigid stainless steel materials and have a relatively large profile. For example, FIG. 1 illustrates a motor assembly 105 provided by MagneMotion Corporation. This motor assembly 105 has a mounting base 110 made of 80-20 aluminum profile and requires a track cross-section of 235×86 mm. Such a large cross-section may be unsuitable in environments where space is limited. Moreover, the cost of constructing and deploying such a large motor assembly and track system may be prohibitive for applications where the budget is limited.

SUMMARY

Embodiments of the present invention address and overcome one or more of the above shortcomings and drawbacks by providing a transportation system which utilizes a linear motor housing that is constructed with smaller dimensions and a reduced materials cost compared to conventional housings.

According to some embodiments, a system for transporting a carrier vehicle using linear motors includes a linear motor housing shaped to hold one or more linear motors. The linear motor housing has a rectangular (or approximately rectangular) top plate and left and right side plates. In one embodiment, the top plate is made of stainless steel and the two side plates are constructed out of extruded aluminum. The left side plate is connected adjacent to a one longitudinal edge of the top plate, while the right side plate connected adjacent to the other longitudinal edge of the top plate. The top plate is designed to support propulsion of the carrier vehicle over its surface. Thus, for example, in one embodiment the upward facing surface of the top plate has a surface roughness between 0.2 µM and 0.4 µM.

The aforementioned linear motor housing may include additional components which help provide a robust propulsion system for carrier vehicles. For example, in some embodiments, the system includes a plurality of coupling components operable to couple the linear motor housing to one or more additional linear motor housings in a manner that facilitates continuous propulsion of the carrier vehicle across the rectangular top plate of the linear motor housing and top plates corresponding to the other linear motor housings. In other embodiments, the system further includes guide rails connected adjacent to each of the longitudinal edges of the linear motor housing.

In some embodiments, the aforementioned linear motor housing includes one or more additional features which are used to ensure efficient operation of the linear motor system. For example, in one embodiment, the linear motor housing further includes electromagnetic shielding material applied to the rectangular top plate and the two side plates. In another embodiment, eddy current shielding material is applied to the rectangular top plate. This eddy current shielding material may additionally be applied to the side plates.

The thickness of the side plates in the aforementioned linear motor housing can vary in different embodiments. In some embodiments, the thickness is minimized to permit flexibility of the linear motor housing. For example, in one embodiment, the thickness of the left side plate and the right side plate are selected to provide the linear motor housing with a torsional flex between −0.25 degrees and 0.25 degrees.

According to another aspect of the present invention, a system for transporting a carrier vehicle using linear motors comprises a plurality of linear motor housings. Each linear motor housing comprises (i) a top plate, (ii) a plurality of side plates and (iii) a plurality coupling components located on vertical edges of each side plate. The system also includes a plurality of pins coupling the linear motor housings together via the coupling components in a manner that allows movement of the carrier vehicle across the rectangular top plate of each linear motor housing. The linear motor housings used in the system may include, for example, straight linear motor housings, 90 degree linear motor housings, or any combination thereof. In some embodiments, one or more of the linear motor housings included in the system includes a mounting surface on the underside of the housing which allows the housing to be mounted to a support structure.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at a transportation system which includes a linear motor housing that is constructed to have reduced dimensions and lower construction costs compared to conventional linear motor housings.

Figure 1:
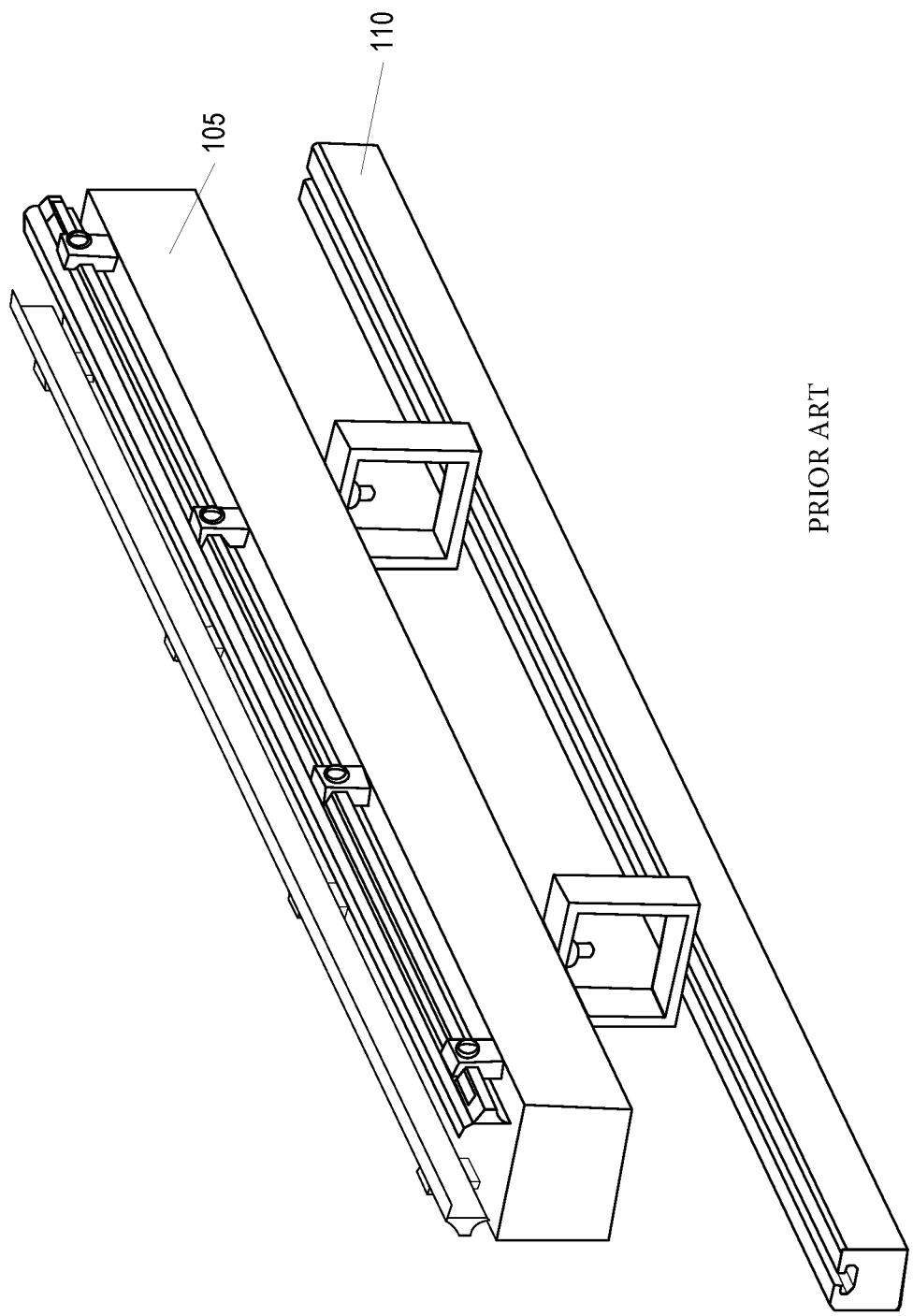
FIG. 1 illustrates an example of a conventional linear motor housing.
Figure 2:
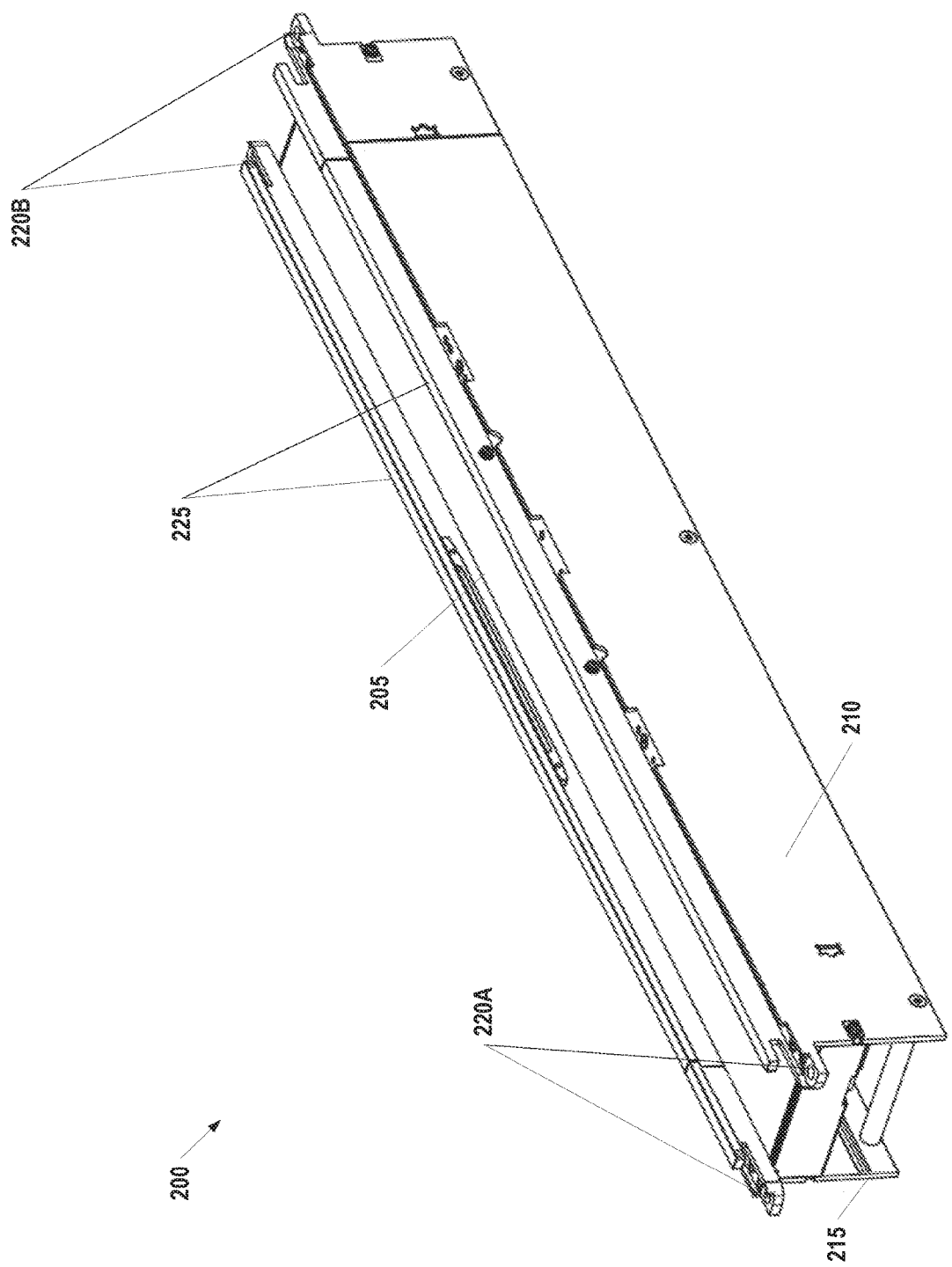
FIG. 2 illustrates an example of a linear motor housing, according to some embodiments of the present invention.

FIG. 2 illustrates an example of a linear motor housing 200, according to some embodiments of the present invention. This linear motor housing 200 is shaped to contain electronics related to a Linear Synchronous Motor (LSM) transport system, including position sensing components, propulsion coils, power electronic components, and microprocessors. The size of each motor can vary, but exemplary sizes are 200 mm or 250 mm in length. In some embodiments, the linear motor housing 200 is shaped in a rectangular design to encase 3-5 of these motors; however, it should be understood that the extrusion length of the linear motor housing 200 could be changed to hold any number of motors.

Carrier vehicles (not shown in FIG. 2) are transported across the sliding surface of the rectangular top plate 205. Motive force can be provided to the carriers in many ways. In some embodiments, the linear motor housing 200 actively participates in providing individualized motive force to each carrier. In some embodiments, motive force is provided by electromagnetic coils in the linear motor housing 200 that propel one or more magnets in the carrier. An exemplary system for providing this motive force is the track system provided by MagneMotion Corporation, which can generally be understood by the description of the linear synchronous motors (LSMs) found in U.S. Published Patent Application 2010/0236445, assigned to MagneMotion Corporation.

The linear motor housing 200 comprises a riveted assembly with a rectangular stainless steel top plate 205, along with a extruded aluminum left side plate 210 and a extruded aluminum right side plate 215. It should be noted that the materials of stainless steel and aluminum are only one example of the combination of materials that can be used with the present invention and, in other embodiments, different combinations of materials may be utilized.

As shown in FIG. 2, each plate 210, 215 is connected adjacent to a longitudinal edge of the rectangular stainless steel top plate. This combination of stainless steel and aluminum provides the chassis with rigidity along the length of the motor (i.e., in the X direction) while also providing torsional flexibility (i.e., in Y-Z direction). This torsional flexibility allows the linear motor housing 200 to compensate for misalignment which may be present on some mounting surfaces. For example, in some embodiments, the extruded aluminum left side plate 210 and the extruded aluminum right side plate 215 combine to provide the linear motor housing with a torsional flex of +/−0.25 degrees. The linear motor housing 200 is self-supported and self-aligned with adjacent motor sections.

As noted above, the top plate 205 in the example of FIG. 2 is constructed of stainless steel sheet metal. The sliding surface of the top plate 205 (i.e., the upward facing surface) is smoothed to facilitate transport of the carriers. In some embodiments, the surface roughness of the sliding surface of the stainless steel top plate 205 is between 0.2 and 0.4 µM.

In some embodiments, the linear motor housing 200 may be constructed using eddy current shielding material (not shown in FIG. 2) to minimize eddy currents induced in the sliding surface of the rectangular stainless steel top plate 205 created by the moving magnetic field of the LSM system. Techniques for eddy current reduction generally known in the art may be adopted for the design of the linear motor housing 200 or the components that it contains. For example, in some embodiments, insulated laminations are used in construction of the magnetic cores. Alternatively (or additionally), the casing of the motor housing may comprise grooved recesses or slots which are positioned to minimize eddy currents in the sliding surface. In some embodiments, the eddy current shielding material is also applied to the extruded aluminum left side plate 210 and the extruded aluminum right side plate 215.

In some embodiments, electromagnetic shielding material is applied to the rectangular stainless steel top plate 205, the extruded aluminum left side plate 210, and the extruded aluminum right side plate 215 to block or reduce Electromagnetic Interference (EMI) within the linear motor housing 200. As is generally understood in the art, electromagnetic shielding uses barriers made of conductive or magnetic material to block electromagnetic fields which may cause EMI. In the context of the example shown in FIG. 2, the cross section of the linear motor housing 200 may provide an electrically conductive enclosure utilizing such materials. Examples of electromagnetic shielding material that may be applied include, without limitation, sheet metal, metal screen materials, and metal foams.

The linear motor housing 200 shown in FIG. 2 also includes coupling components 220A, 220B located on the vertical edge of the housing 200 when in use. As shown in FIG. 2, the coupling components 220A, 220B are located at the top of the vertical edge, but the coupling components could be located in different locations in other embodiments (e.g., at the bottom of the vertical edge). The coupling components 220A, 220B are operable to couple the linear motor housing 200 to one or more additional linear motor housings (not shown in FIG. 2) in a manner that facilitates continuous propulsion of the carrier vehicle across the sliding surface of the top plate 205 and the sliding surfaces of the other linear motor housings. Various types of coupling components may be utilized in joining housings. For example, in some embodiments, a click-based mechanism may be employed where individual housings click together. In other embodiments, the coupling components 220A, 220B may comprise apertures which are designed aligned and joined via a pin or other fastening device (see FIG. 3).

The transportation system employing the linear motor housing 200 also includes guide rails 225 connected to the longitudinal edges of the linear motor housing 200. These guide rails help to channel the carrier vehicle as it moves across the sliding surface of the top plate 205. The dimensions of these guide rails 225 may be selected based on the dimensions of the carrier vehicle(s) that will be using the transportation system. Although, in principle, any material may be used in constructing the guide rails 225, certain materials may be more preferable in order to maintain the torsional flexibility or other design features of the linear motor housing 200.

Figure 3:
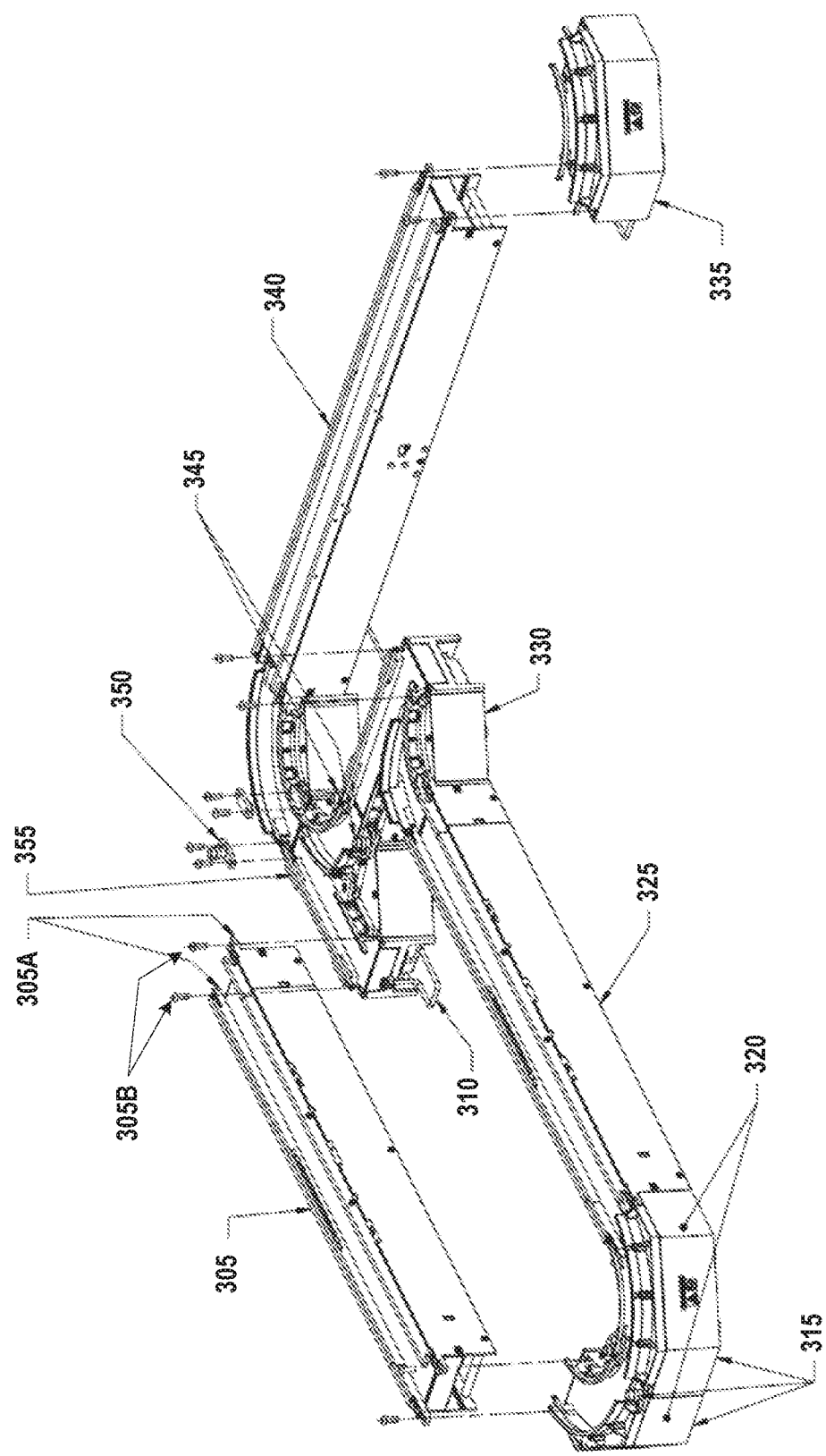
FIG. 3 shows how multiple linear motor housings can be coupled together to form a track, according to some embodiments.

FIG. 3 shows how multiple linear motor housings can be coupled together to form a track, according to some embodiments. In this example, there are three straight linear motor housings 305, 325, and 340 which are similar to the linear motor housing 200 shown in FIG. 2. Each linear motor housing 305, 325, and 340 can be coupled to other components of the track by aligning the coupling components of each respective housing (e.g., coupling components 305A) and inserting pins (e.g., pins 305B) into the coupling components.

The example of FIG. 3 also shows motor housings 320 and 335 in curved configurations allows for 90 degree turns. These motor housings 320, 335 are referred to herein as "90 degree motor housings." As depicted in motor housing 320, two 90 degree motor housings may be coupled together to create a curve which reverses the direction of travel of a carrier vehicle. FIG. 3 also shows a merge/diverge motor housing 330 which facilitates merger of carrier vehicles being transported between motor housings, or divergence to adjacent housings.

A link motor connect component 315 is used to align the two 90 degree motor housings. A link motor connect component can be used to provide linear and lateral alignment of other components (e.g., link motor connect 350). Additional alignment is provided by an eccentric lateral guide alignment component 345. A motor-to-motor interconnect cable is used to connect linear motors contained in each housing.

Figure 4:
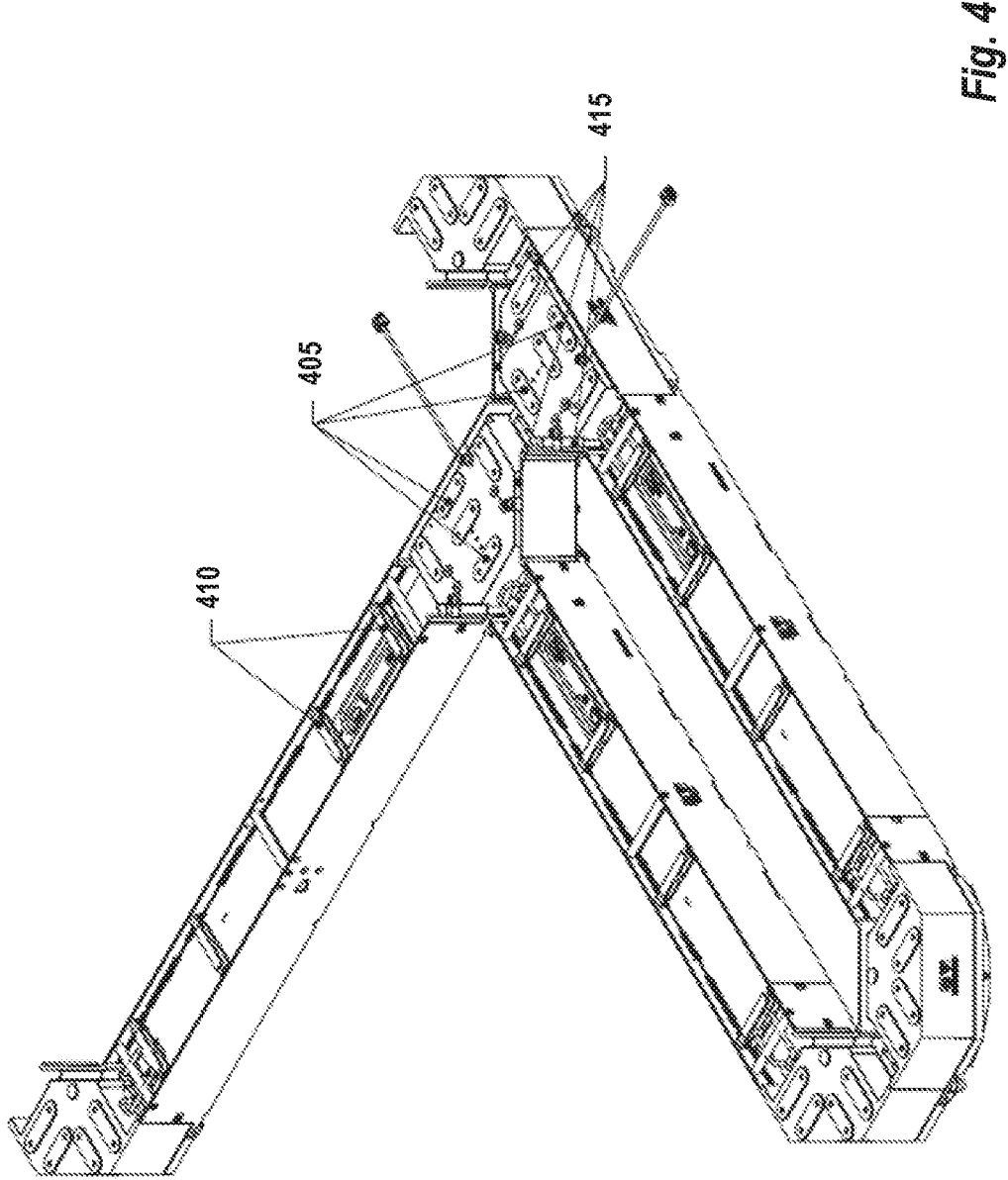
FIG. 4 provides a view of the underside of the track, as it may be configured in some embodiments.
Figure 5:
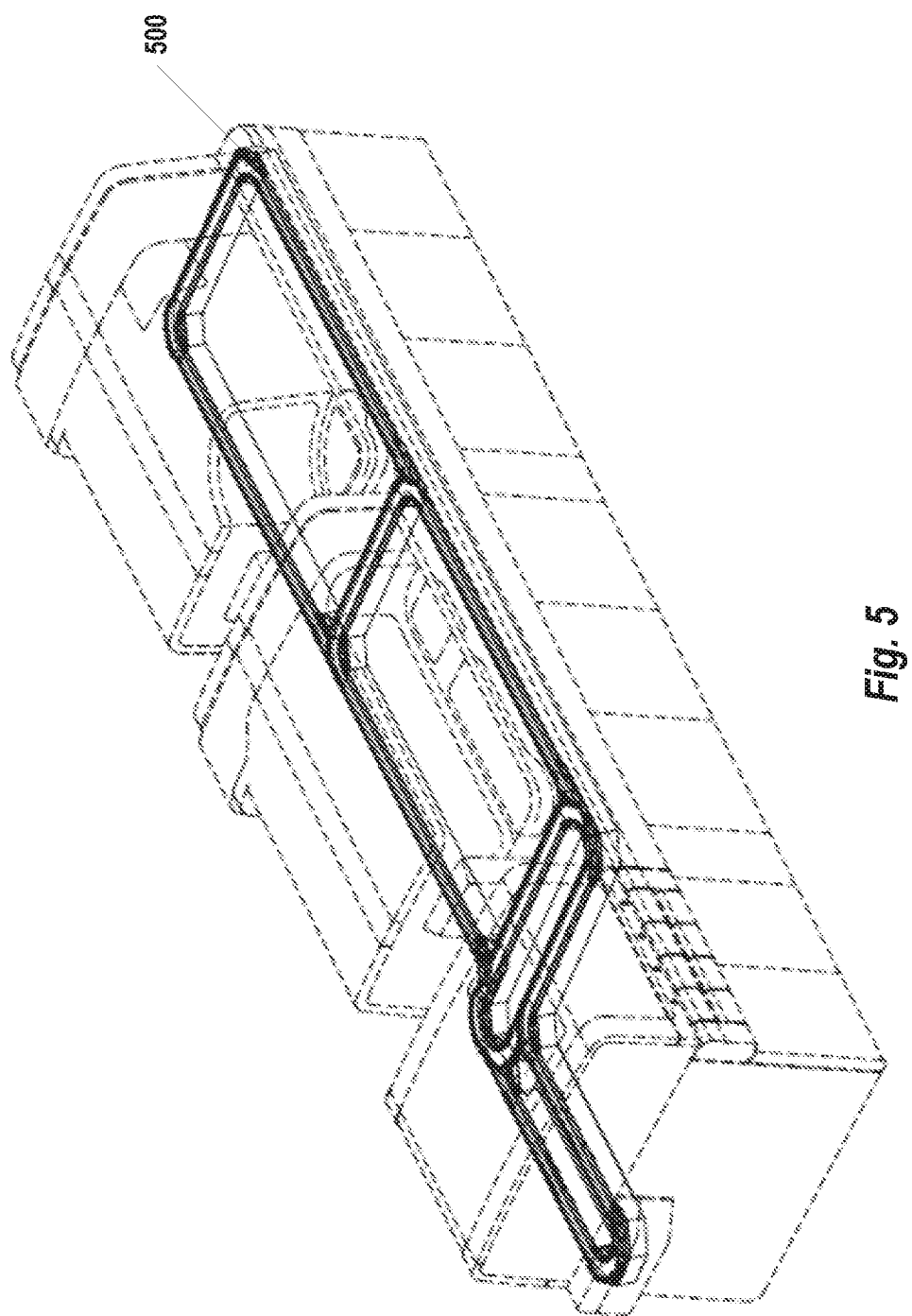
FIG. 5 is a perspective view of a track in accordance with an embodiment with dashed lines depicting the exterior of an in vitro diagnostic system.

The track shown in FIG. 3 is designed to be elevated from the ground by a frame (see FIG. 5). In some embodiments, support surfaces are provided to connect each housing to the frame. In other embodiments, only a subset of the housings is supported. For example, in some embodiments, only the 90 degree motor housings are supported, while the other housings are supported by the coupling to the 90 degree motor housings. FIG. 4 provides a view of the underside of the track, as it may be configured in some embodiments. The term "underside," as used herein refers to the side of the housing that is downward-facing when the housing is installed and in use. As shown in FIG. 4, the 90 degree motor housings and other curved housings have motor block mounting surfaces (e.g. surface 405) to allow mounting with the frame. Electrical cables are routed through the cable clips (e.g. clips 410) and cable channels (e.g., channels 415) situated within each motor housing.

Using the general connections and components discussed above with respect to FIG. 3, larger and more complex track configurations can be developed. For example, FIG. 5 is a perspective view of a track 500 in accordance with an embodiment with dashed lines depicting the exterior of an in vitro diagnostic system.

The system of the figures is not exclusive. Other systems may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. No claim element herein is to be construed under the provisions of 35 U.S.C. 112, sixth paragraph, unless the element is expressly recited using the phrase "means for."

The invention claimed is:

1. A system for transporting a carrier vehicle using linear motors, the system comprising:
a linear motor housing shaped to hold one or more linear motors, the linear motor housing comprising:
a rectangular top plate,
a left side plate connected adjacent to a first longitudinal edge of the rectangular top plate,
a right side plate connected adjacent to a second longitudinal edge of the rectangular top plate, and
a plurality of coupling components operable to couple the linear motor housing to one or more adjacent linear motor housings in a manner that facilitates continuous propulsion of the carrier vehicle across the rectangular top plate of the linear motor housing and rectangular top plates corresponding to the one or more adjacent linear motor housings, and
an electromagnetic shielding material applied to the rectangular top plate, the left side plate, and the right side plate,
wherein the linear motor housing is coupled to an adjacent linear motor housing using a click-based mechanism where individual housings are configured to be joined via one of clicking together, and joining apertures with a fastening device.

2. The system of claim 1, further comprising eddy current shielding material applied to the rectangular top plate.

3. The system of claim 2, wherein the eddy current shielding material is further applied to the left side plate and the right side plate.

4. The system of claim 1, wherein the left side plate and the right side plate provide the linear motor housing with a torsional flex between −0.25 degrees and 0.25 degrees.

5. The system of claim 1, wherein an upward facing surface of the rectangular top plate has a surface roughness between 0.2 μM and 0.4 μM.

6. The system of claim 1, further comprising:
a first guide rail connected adjacent to the first longitudinal edge of the linear motor housing; and
a second guide rail connected adjacent to the second longitudinal edge of the linear motor housing.

7. The system of claim 1, wherein the rectangular top plate is constructed of stainless steel, the left side plate is constructed of extruded aluminum, and the right side plate is constructed of extruded aluminum.

8. The system of claim 1, wherein the linear motor housing is coupled to an adjacent linear motor housing using a pin inserted through adjacent coupling components on the linear motor housing and the adjacent linear motor housing.

9. A system for transporting a carrier vehicle using linear motors, the system comprising:
a plurality of linear motor housings, wherein each linear motor housing comprises (i) a rectangular top plate, (ii) a plurality side plates, (iii) a plurality coupling components located on vertical edges of each side plate, and (iv) an electromagnetic shielding material applied to the rectangular top plate and the plurality of side plates;
a plurality of pins coupling the linear motor housings together via the plurality of coupling components in a manner that allows movement of the carrier vehicle across the rectangular top plate of each linear motor housing.

10. The system of claim 9, wherein the plurality of linear motor housings comprise a plurality of straight linear motor housings and a plurality of 90 degree linear motor housings.

11. The system of claim 10, wherein each 90 degree linear motor housing further comprises a mounting surface located on the underside of the 90 degree linear motor housing while in use.

12. The system of claim 8, further comprising eddy current shielding material applied to the rectangular top plate.

13. The system of claim 12, wherein the eddy current shielding material is further applied to the plurality side plates.

14. The system of claim 9, wherein the plurality side plates provide each linear motor housing with a torsional flex between −0.25 degrees and 0.25 degrees.

15. The system of claim 9, wherein an upward facing surface of each rectangular top plate has a surface roughness between 0.2 µM and 0.4 µM.

16. The system of claim 9, further comprising a plurality of guide rails connected adjacent to longitudinal edges of each linear motor housing.

17. A system for transporting a carrier vehicle using linear motors, the system comprising:
   a linear motor housing shaped to hold one or more linear motors, the linear motor housing comprising:
      a rectangular stainless steel top plate,
      an extruded aluminum left side plate connected adjacent to a first longitudinal edge of the rectangular stainless steel top plate,
      an extruded aluminum right side plate connected adjacent to a second longitudinal edge of the rectangular stainless steel top plate, and
      an electromagnetic shielding material applied to the rectangular top plate, the left side plate, and the right side plate,
      wherein the linear motor housing is coupled to an adjacent linear motor housing using a click-based mechanism where individual housings are configured to be joined via one of clicking together, and joining apertures with a fastening device.

* * * * *